United States Patent
Ophey

(10) Patent No.: US 6,724,353 B2
(45) Date of Patent: Apr. 20, 2004

(54) DISPLAY DEVICE

(75) Inventor: Willem Gerard Ophey, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 209 days.

(21) Appl. No.: 09/923,603

(22) Filed: Aug. 7, 2001

(65) Prior Publication Data

US 2002/0126065 A1 Sep. 12, 2002

(30) Foreign Application Priority Data

Aug. 8, 2000 (EP) .............................................. 00202798

(51) Int. Cl.⁷ ................................................. G09G 5/00
(52) U.S. Cl. ........................................... 345/8; 359/630
(58) Field of Search ....................... 345/7, 8, 9; 359/15, 359/13, 22, 24, 630, 629

(56) References Cited

U.S. PATENT DOCUMENTS

| | | | |
|---|---|---|---|
| 4,153,371 A | * 5/1979 | Koizumi et al. | ............ 356/400 |
| 4,634,384 A | 1/1987 | Neves et al. | ................... 434/44 |
| 5,572,229 A | * 11/1996 | Fisher | ............................ 345/8 |
| 5,912,650 A | 6/1999 | Carollo | ........................... 345/7 |
| 6,094,283 A | * 7/2000 | Preston | ......................... 359/15 |
| 6,222,675 B1 | * 4/2001 | Mall et al. | ................... 359/630 |
| 6,570,629 B1 | * 5/2003 | Hirakata et al. | ............... 349/15 |

* cited by examiner

*Primary Examiner*—Amare Mengistu
(74) *Attorney, Agent, or Firm*—Gregory L. Thorne

(57) ABSTRACT

A display device comprising at least one light modulation panel and at least two projection elements, wherein, in operation, an image having a relatively high resolution in a relatively small field of view is presented to a first eye by means of the first projection element, while an image having a relatively low resolution in a relatively large field of view is presented to a second eye by means of the second projection element. The second projection element is provided with means for masking a part of the large field of view, which part substantially corresponds to the small field of view.

8 Claims, 1 Drawing Sheet

DISPLAY DEVICE

Figure 1:
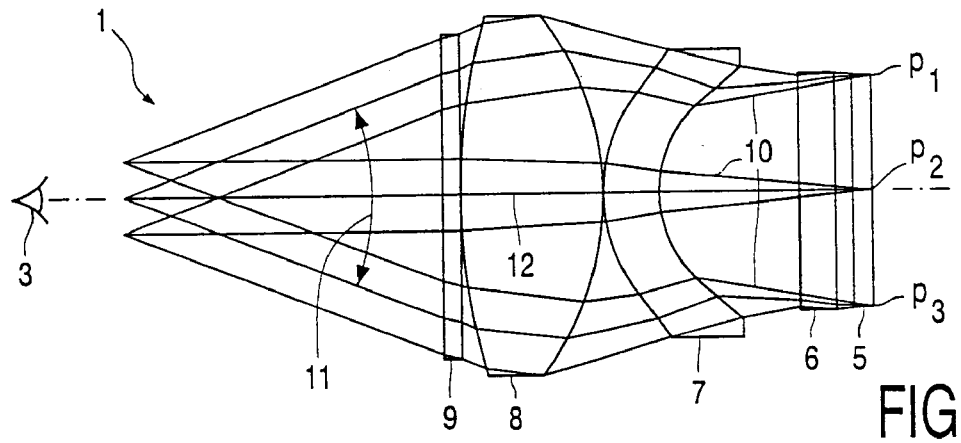

The invention relates to a display device comprising at least one line modulation panel and at least two projection elements, in which, in operation, an image having a relatively high resolution in a relatively small field of view is presented to a first eye by means of the first projection element, while an image having a relatively low resolution in a relatively large field of view is presented to a second eye by means of the second projection element.

In such a display device, which is known from U.S. Pat. No. 5,912,650, an image having a relatively high resolution for a relatively small field of view or an image having a relatively low resolution for a relatively large field of view is alternately generated by means of the light modulation panel. The display device is provided with means for alternately presenting the first or the second image to the first or the second eye. Thus, images having a relatively high resolution in a relatively small field of view are observed by one eye, while images having a relatively low resolution in a relatively large field of view are observed by the other eye.

The images presented to both eyes are combined in the human brain to an image having a relatively large field of view with a relatively low resolution in which a relatively small field of view with a relatively high resolution is located.

The display device described in U.S. Pat. No. 5,912,650 has, however, a plurality of drawbacks. The light modulation panel is to be controlled alternately for generating an image with a relatively high resolution in a relatively small field of view and for generating an image with a relatively low resolution in a relatively large field of view. Consequently, the control of the light modulation panel is relatively complicated. Moreover, also the part corresponding to the small field of view is illuminated by the second projection element, which part is replaced in the human brain by the image having a relatively high resolution and formed by means of the first projection element.

Consequently, an optimal illumination is not obtained.

It is an object of the invention to provide a display device in which images having a relatively low resolution in a relatively large field of view are generated in a simple manner, while a relatively small field of view having a relatively high resolution is located in the large field of view.

In the display device according to the invention, this object is achieved in that the second projection element with the large field of view is provided with means for masking a part of the large field of view, which part substantially corresponds to the small field of view.

Since the part of the large field of view corresponding to the small field of view is masked by means of the second projection element, both projection elements can be optimized for the function to be performed by the relevant projection elements, namely for generating an image with a relatively high resolution in a relatively small field of view, or for generating an image with a relatively low resolution in a relatively large field of view, with one image being presented to one eye and the other image being presented to the other eye.

An embodiment of the display device according to the invention is characterized in that each projection element is provided with a separate light modulation panel in which the image for a relatively small field of view can be generated by means of the first light modulation panel, while the image for the relatively large field of view can be generated by means of the second light modulation panel.

In this way, images can be continuously presented to both eyes.

A further embodiment of a display device according to the invention is characterized in that the second projection element is provided with the light modulation panel, a lens preceding the light modulation panel, a concave mirror surrounding the light modulation panel and a layer preceding the lens, which layer is reflective to light beams from the lens towards the concave mirror, said layer being provided with a masked part for masking the desired part of the large field of view.

A relatively large field of view can be generated in a simple manner by means of such a projection element which is provided with a concave mirror. The part to be withdrawn from the large field of view is effectively masked by the masked part provided on the layer.

Moreover, the masking prevents light rays from the light modulation panel from directly reaching the eye. These light rays do not contribute to the formation of the image on the retina of the eye. They disturb the image. This is also referred to as stray light.

In principle, a 100% transmission for the light rays from the light modulation panel to the pupil of the eye can be obtained by the masking effect.

These and other aspects of the invention are apparent from and will be elucidated with reference to the embodiments described hereinafter.

Figure 2:
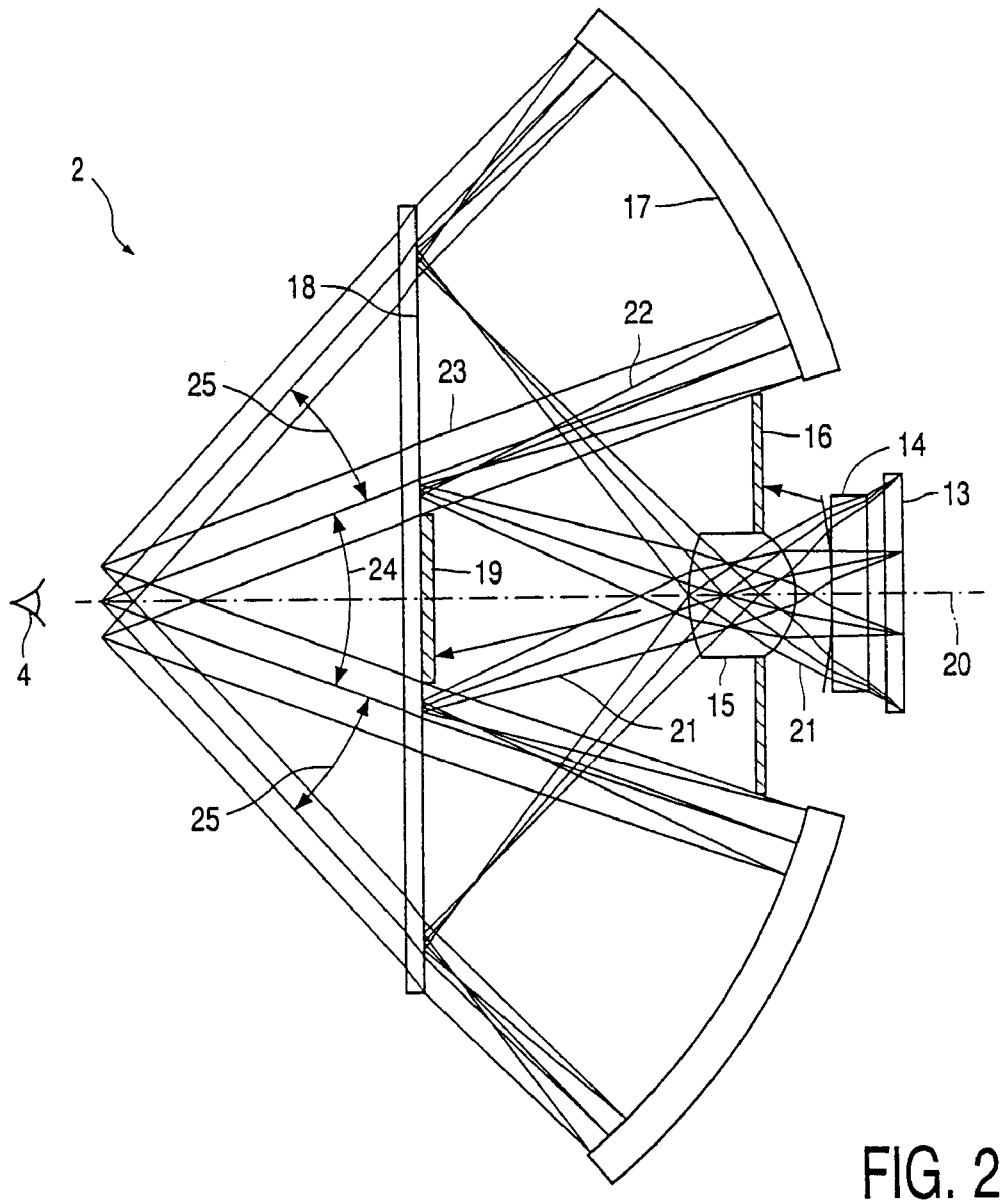

In the drawings:

FIG. 1 shows a projection element of a display device according to the invention for generating an image with a relatively high resolution in a relatively small field of view, FIG. 2 shows a projection element of a display device according to the invention for generating an image with a relatively low resolution in a relatively large field of view.

In the Figures, corresponding components are denoted by the same reference numerals.

FIGS. 1 and 2 show projection elements 1, 2 of a display device according to the invention, which can be positioned on or around a user's head. The first projection element 1 can be positioned in front of the first eye 3 of a user, while the second projection element 2 can be positioned in front of the other, second eye 4 of the user.

The first projection element 1 is provided with a light modulation panel 5, an illumination unit 6 preceding the light modulation panel, two lenses 7, 8 preceding the illumination unit 6, and a cover glass 9 preceding the lenses 7, 8. The lenses 7, 8 image light beams 10 from the light modulation panel 5 in a relatively small viewing angle 11 of, for example, 40° with respect to the optical axis 12 of the projection element 1.

FIG. 1 shows the radiation of only three pixels P1, P2, P3 of the light modulation panel 5 to the pupil of the eye, a central pixel P2 and two pixels P1, P3 on the edge of the light modulation panel 5. The radiation of each individual pixel P1 to P3 is shown by means of three rays, a central ray going from the center to the pupil of the eye and two rays going to the edge of the eye.

FIG. 2 shows the second projection element 2 which is provided with a light modulation panel 13, an illumination unit 14 preceding the light modulation panel 13, a lens 15 preceding the illumination unit 14, a masking ring 16 surrounding the lens 15, a concave mirror 17 surrounding the masking ring 16, and a layer 18 preceding the lens 15. The layer 18 is provided with a masked part 19 which symmetrically surrounds the optical axis 20 of the projection element 2.

The layer 18 is reflective to light beams from the light modulation panel 13 and transparent to the light beams from the concave mirror 17.

The layer 18 may be a semi-transmissive mirror, a mirror which is sensitive to the direction of polarization, or a cholesteric mirror.

The projection element 2 operates as follows. Light beams 21 from the light modulation panel 13 are deflected by the lens 15 to a part of the layer 18 located outside the masked part 19. At this part of the layer, the light beams 21 are reflected as light beams 22 towards the concave mirror 17. The light beams 22 are subsequently reflected again as light beams 23 by the concave mirror 17 and subsequently pass through the layer 18 into the direction of the eye 4. Due to the deflecting effect of the lens 15 as well as by the masked part 19 and the masking ring 16, it is prevented that a centrally located field of view 24 is illuminated. Consequently, only the field of view 25 surrounding the field of view 24 is imaged on the eye 4 by means of the projection element 2. The viewing angle of the field of view 25 is, for example, 40° to 96°.

The light modulation panel 13 generates an image of the relatively large field of view. A relatively low resolution is achieved by the relatively large field of view. Moreover, the rays of the projection element 2 are imaged outside the central part of the retina. Here, the eye has also a smaller resolution and becomes increasingly smaller as it is more remote from the blind spot. However, an image on the high-resolution central part of the retina for the relatively small field of view is generated by means of the light modulation panel 5, so that the image acquires a relatively high resolution. The images imaged on both eyes 3, 4 are combined in the human brain to a single image, in which a relatively large field of view with a relatively low resolution is combined with a preferably centrally located small field of view with a relatively high resolution.

If layer 18 is provided with a cholesteric mirror, a $\lambda/4$ plate, which converts linearly polarized light into circularly polarized light, is arranged between the lens 15 and the layer 18.

If layer 18 is provided with a reflective polaroid, a $\lambda/4$ plate is arranged right in front of the concave mirror 17 so as to rotate the linear direction of polarization through 90°.

What is claimed is:

1. A display device comprising at least one light modulation panel and at least two projection elements, in which, in operation, an image having a relatively high resolution in a relatively small field of view is presented to a first eye by means of the first projection element, while an image having a relatively low resolution in a relatively large field of view is presented to a second eye by means of the second projection element, characterized in that the second projection element with the large field of view is provided with means for masking a part of the large field of view, which part substantially corresponds to the small field of view.

2. A display device as claimed in claim 1, characterized in that each projection element is provided with a separate light modulation panel in which the image for a relatively small field of view can be generated by means of the first light modulation panel, while the image for the relatively large field of view can be generated by means of the second light modulation panel.

3. A display device as claimed in claim 1, characterized in that the second projection element is provided with the light modulation panel, a lens preceding the light modulation panel, a concave mirror surrounding the light modulation panel and a layer preceding the lens, which layer is reflective to light beams from the lens towards the concave mirror, said layer being provided with a masked part for masking the desired part of the large field of view.

4. A display device as claimed in claim 3, characterized in that a masking ring surrounds the lens.

5. A display device as claimed in claim 3, characterized in that the layer is a semi-transmissive mirror, a reflective polaroid, a polarization-sensitive mirror or a cholesteric mirror.

6. A display device as claimed in claim 5, characterized in that a $\frac{1}{4}\lambda$ layer is arranged between the lens and the concave mirror, on the one hand, and the cholesteric mirror, on the other hand, by means of which layer linearly polarized light is convertible into circularly polarized light.

7. A display device as claimed in claim 5, characterized in that a $\frac{1}{4}\lambda$ layer precedes the concave mirror, by means of which layer the linear direction of polarization is rotatable through 90°.

8. A display device as claimed in claim 1, characterized in that the large field of view has a viewing angle which is larger than approximately 40°, while the small field of view has a viewing angle which is smaller than approximately 40°, the viewing angles of the small field of view and the large field of view at least adjoining each other.

* * * * *